US010635518B2

(12) United States Patent
Olson et al.

(10) Patent No.: US 10,635,518 B2
(45) Date of Patent: Apr. 28, 2020

(54) DETECTING BUS FAULTS

(71) Applicant: HEWLETT PACKARD ENTERPRISE DEVELOPMENT LP, Houston, TX (US)

(72) Inventors: Alex Olson, Houston, TX (US); Thomas Rhodes, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 134 days.

(21) Appl. No.: 15/798,442

(22) Filed: Oct. 31, 2017

(65) Prior Publication Data
US 2019/0129778 A1    May 2, 2019

(51) Int. Cl.
| G06F 11/07 | (2006.01) |
| G06F 13/42 | (2006.01) |
| G06F 11/34 | (2006.01) |
| G06F 11/30 | (2006.01) |
| H04L 12/40 | (2006.01) |

(52) U.S. Cl.
CPC ........ *G06F 11/079* (2013.01); *G06F 11/0751* (2013.01); *G06F 11/3027* (2013.01); *G06F 11/349* (2013.01); *G06F 11/3419* (2013.01); *G06F 13/4286* (2013.01); *G06F 13/4295* (2013.01); *H04L 2012/40215* (2013.01)

(58) Field of Classification Search
CPC .. G06F 11/0751; G06F 11/079; G06F 11/221; G06F 11/3089; G06F 11/26; H04L 12/28; H04L 12/40078; H04L 12/40084
See application file for complete search history.

(56) References Cited

U.S. PATENT DOCUMENTS

| 5,964,858 | A  | * | 10/1999 | Denman  | G06F 13/126 710/107 |
| 6,625,163 | B1 | * | 9/2003  | Shideler | G06F 13/376 370/230 |
| 7,581,031 | B2 | * | 8/2009  | Konz    | G06F 13/4068 709/250 |
| 8,015,445 | B2 | * | 9/2011  | Ando    | H04L 43/0823 714/25 |
| 8,213,321 | B2 | * | 7/2012  | Butts   | H04L 41/0659 370/242 |
| 8,290,103 | B2 |   | 10/2012 | Lu et al. | |

(Continued)

OTHER PUBLICATIONS

Ma, X-M, et al., "Coal Gangue On-Line Recognition and Automation Selection System Based on Arm and Can Bus," (Research Paper), Aug. 2015, pp. 988-992, 5 pgaes, http://ieeexplore.ieee.org/abstract/document/1527087/.

(Continued)

*Primary Examiner* — Nadeem Iqbal
(74) *Attorney, Agent, or Firm* — Hewlett Packard Enterprise Patent Department

(57) ABSTRACT

A technique includes monitoring a sequence of bits of data communicated to a transmitter of a node, where the transmitter communicates signals with a bus in response to the sequence of bits. The technique includes determining whether the sequence of bits represents acknowledgement by the node that data was received from the bus in an associated data frame and represents detection by the node of an error associated with the data frame. The technique includes detecting a fault associated with the bus based on the result of the determination.

19 Claims, 6 Drawing Sheets

(56) References Cited

U.S. PATENT DOCUMENTS

| | | | |
|---|---|---|---|
| 8,432,814 B2* | 4/2013 | Fuhrmann | H04L 12/40013 370/242 |
| 8,929,262 B2 | 1/2015 | Feuerstraeter et al. | |
| 2009/0106606 A1* | 4/2009 | Duan | G06F 11/0739 714/48 |
| 2010/0260102 A1* | 10/2010 | Liu | H04L 1/1657 370/328 |
| 2016/0294725 A1 | 10/2016 | Maise et al. | |

OTHER PUBLICATIONS

Jose' Rufino, "Redundant CAN Architectures for Dependable Communication", Technical Report: CSTC RT-97-07, Dec. 1997, pp. 1-14.

* cited by examiner

DETECTING BUS FAULTS

BACKGROUND

In an automobile-based control system or industrial automation system, peripheral devices, such as sensors and actuators, may communicate using a controller area network (CAN) bus. The CAN bus typically has a pair of differential communication lines that are driven in synchronization with a clock signal to serially indicate data. One of more peripherals at a given location may communicate with the CAN bus through the use of an associated CAN bus controller and transceiver. The CAN controller regulates the format/protocol of the CAN bus messaging, and the transceiver translates voltage levels between the CAN bus and the CAN bus controller.

DETAILED DESCRIPTION

Figure 1:
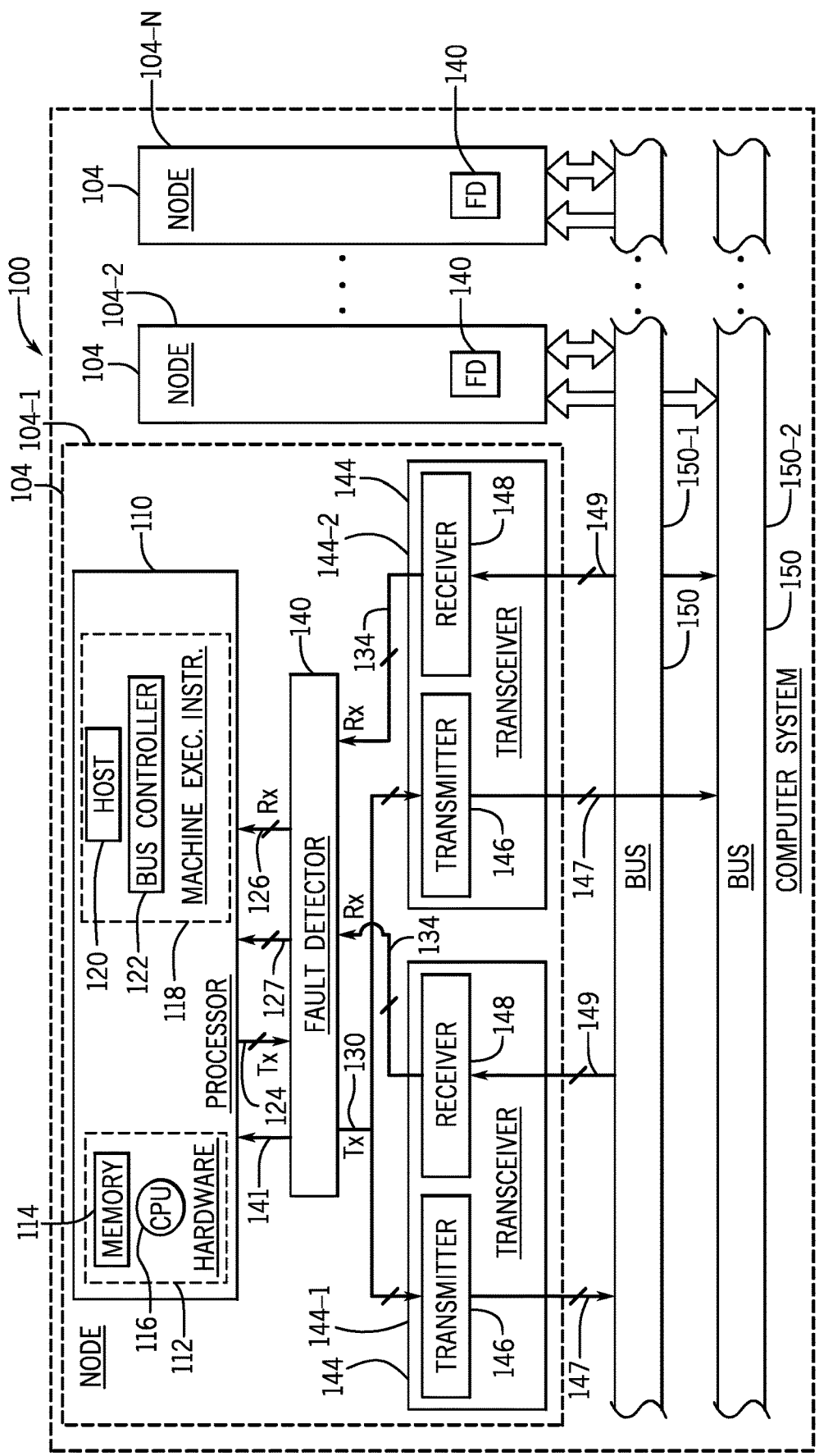
FIG. 1 is a schematic diagram of a computer system that includes redundant controller area network (CAN) buses according to an example implementation.

Referring to FIG. 1, in accordance with example implementations, a computer system 100 includes one or multiple nodes 104 (N example nodes 104-1, 104-2, . . . , 104-N, being schematically depicted in FIG. 1 as examples), which communicate with each other using a set of redundant buses 150 (two buses 150-1 and 150-2, being depicted in FIG. 1 as examples). In this manner the redundant buses 150 concurrently indicate the same data bit (assuming no faults). Due to the shared nature of communication over a given bus 150, the bus 150 may become a single point of failure. For example, a single bent connector pin on a given bus device may cause an electrical short on the bus 150 or there may be a mating issue with a bus connector, which may disrupt communication on the bus 150.

The redundant bus architecture provides a relatively more robust, fault tolerant form of communication by providing an alternative communication path should the communication on a given bus 150 become impaired. It is noted that although two buses 150 are depicted in FIG. 1, the computer system 100 may have three, four or more buses to form a set of redundant buses, in accordance with further example implementations.

In accordance with example implementations that are described herein, the processor node 104 includes a fault detector 140, which is constructed to detect a fault occurring with one the buses 150 and alert the node 104 to the detected fault so that the node 104 may disable use the bus 150 by the node 104. In accordance with example implementations, the fault detector 140 may be formed from logic (a complex programmable logic device (CPLD), for example), which is constructed to detect faults on the buses 150 without decoding any of the frames that are communicated over the buses 150.

As a more specific example, in accordance with example implementations discussed herein, the nodes 104 and the buses 150 may form a controller area network (CAN). It is noted, however, that other networks and other redundant buses employing other bus communication protocols may be used, in accordance with further implementations.

In accordance with example implementations, the bus 150 employs serial communication in which a pair of data lines of the bus 150 differentially indicates, or represents, a serial stream of data bits. This stream is synchronized to a clock signal. The serial data represents message payload data, node identifiers, and so forth. At a given time, one of the nodes 104 may be granted use of the buses 150, and as such, may transmit one or more messages via the buses 150 to a receiving node 104. The process, called "arbitration," involves deciding which node 104 is granted the present right to transmit on the buses 150 may be achieved, according to example implementations, through the use of node identifications (IDs); and dominant and recessive bits.

As an example, a given node 104 may request use of the buses 150 by serially communicating its ID to the buses 150. In this manner, the ID of the node 104 may be a preamble sequence of zeros followed by another sequence of ones and zeros. When multiple nodes 104 concurrently request the buses 104, the nodes 104 concurrently serially furnish their IDs to the buses 150, and the arbitration scheme selects the node 104 whose ID bit is the last ID bit to be "dominant." In this regard, in accordance with example implementations, a "dominant" bit is associated with a logic zero, and a "recessive" bit is associated with logic one. A dominant bit is actively driven to a voltage by a transmitter of a node, and a recessive bit is passively returned to a second voltage by a resistor. Initially during the serial ID transmission, all of the nodes 104 transmit dominant bits due to the above-described ID preamble of zeros; but eventually, one of the nodes 104 (the arbitration winner) transmits a dominant bit, while the remaining nodes 104 vying for the buses 150 transmit recessive bits.

In general, each node 104, in accordance with example implementations, includes a transceiver 144 (transceivers 144-1 and 144-2 being depicted in FIG. 1 for the node 104-1). In this manner, as depicted in FIG. 1, each transceiver 144 may be associated with and coupled to one of the buses 150 (i.e., for the example of FIG. 1, transceiver 144-1 is coupled to the bus 150-1, and transceiver 1442—is coupled to the bus 150-2). The transceiver 144 includes a transmitter 146, which has an output 147 coupled to the CAN bus 150 for purposes of driving signal lines of the CAN bus 150 to transmit data to the CAN bus 150; and a receiver 148 having an input 149 coupled to the CAN bus 150 to sense signals presents on signal lines of the CAN bus 150 for purposes of receiving data from the CAN bus 150.

In accordance with example implementations, the node 104 includes a processor 110. In general, the processor 110 may include hardware 112, such as a memory 114 and one or multiple central processing unit (CPU) cores 116. In general, the memory 114 is a non-transitory storage medium that may be formed from semiconductor storage devices, phase change memory devices, memristor storage devices, non-volatile memory storage devices, volatile memory storage devices, storage devices selected from one or more of the foregoing storage technologies; and so forth. In accordance with example implementations, one or multiple CPU processing cores 116 may execute instructions that are stored in the memory 114 for purposes of processing data involved in communications occurring over the CAN buses 150-1 and 150-2.

More specifically, in accordance with example implementations, the memory 114 may include machine executable instructions 118 (or "software"), which, when executed by one or multiple CPU processing cores 116, may cause the core(s) 116 to form a host 120 and a bus controller 122 of the processor 110. In general, the bus controller 122 may encode data to be communicated over the CAN buses 150 into corresponding packets of data; and for purposes of receiving data packets from the CAN buses 150, the bus controller 122 may decode received data.

In accordance with further example implementations, the processor 110 may include one or multiple hardware circuits that do not execute machine executable instructions for purposes of forming one or multiple components of the processor 110, such as, for example, the bus controller 122. In this regard, in accordance with further example implementations, in place of a CPU core executing instructions, for example, the processor 110 may include a hardware circuit that does execute instructions, such as, for example, a field programmable gate array (FPGA) or an application specific integrated circuit (ASIC).

In accordance with example implementations, the bus controller 122 monitors an error output 141 that is provided by the fault detector 140. As an example, in accordance with some implementations, the output 141 may be provided to an interrupt signal pin of the processor 110. In accordance with further example implementations, the error output 141 may be associated with multiple signal pins of the processor 110. Regardless of its particular form, the error output 141, when asserted, informs the bus controller 122 of a fault that has been detected by the fault detector 140 and identifies the particular CAN bus 150-1 or 150-2 associated with the detected fault. The bus controller 122 may then, in response to the identified fault, disable the corresponding transceiver 144-1 or 144-2 associated with the fault to correspondingly disable the associated CAN bus 150-1 or 150-2.

In accordance with example implementations, the fault detector 140 may monitor communications between the processor 110 and the transceivers 144-1 and 144-2 for purposes of detecting CAN bus faults. In this manner, in accordance with some implementations, the fault detector 140 may observe transmit data that is communicated from a transmit output 124 of the processor 110 to transmit outputs 130 of the transceivers 144-1 and 144-2; and the fault detector may observe receive data that is communicated from the transceiver receive outputs 134 of the transceivers 144-1 and 144-2 to corresponding receive inputs 126 and 127 of the processor 110.

More specifically, in accordance with some implementations, the fault detector 140 monitors the data communicated between the processor 110 and the transceivers 144-1 and 144 to detect certain bit patterns, or sequences, that are associated with faults. The patterns may be attributable to a fault that occurs due to an open circuit, or an unterminated pin. When this occurs, the affected node 104 may perceive a locally transmitted dominant bit "bleed" into the next bit (especially when the next bit is a recessive bit).

During normal, or correct, frame reception from the CAN bus 150, a receiving node 104 (i.e., a node 104 that is intended to receive the frame) may transmit a dominant acknowledgement bit for purposes of indicating to the transmitting node 104 (i.e., the node 104 that provides the data to the CAN bus 150) that the data frame was properly received. The receiving node 104 may expect to see a recessive acknowledgment delimiter bit immediately following the dominant acknowledgement bit. However, if the acknowledgement delimiter bit is not recessive, this is an error, and the receiving node 104 may thereafter transmit a six bit error flag to the CAN bus 150 (assuming that the receiving node 104 is in the error passive state).

Figure 2:
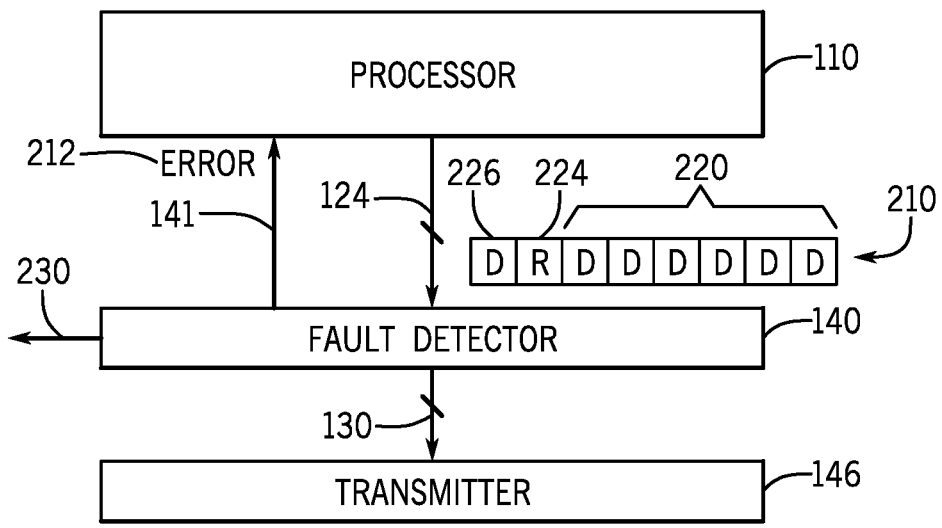
FIGS. 2 and 3 are schematic diagrams illustrating detection of CAN bus faults according to example implementations.

In accordance with example implementations, the fault detector 140 may detect faults according to an illustration 200 of FIG. 2. Referring to FIG. 2 in conjunction with FIG. 1, the fault detector 140 may monitor the transmit output 124 of the processor 110 (to be transmitted to the CAN bus 150) for a bit sequence, or pattern 210, of "DRDDDDDD" (where "R" denotes a recessive bit and "D" denotes a dominant bit) after a period of more than six recessive bits.

The bit pattern 210 may be a relatively unique pattern that occurs for the case in which the node 104 positively acknowledges the correct reception of a frame (i.e., the first D bit 226 is dominant to indicate correct reception of the data frame), but after the next bit 224 (a recessive bit to indicate an acknowledgment delimiter), the node 104 transmits an error flag. The error flag appears in the bit sequence 210 as a sequence 220 of six bits. In accordance with example implementations, the bit pattern 210 may not appear in any other circumstance on the CAN bus 150 due to the precisely prescribed nature of the CAN standard for error handling. Therefore, in accordance with example implementations, in response to the fault detector 140 detecting the bit pattern 210, the fault detector 140 communicates to the processor 110 (via the error output 141) to alert the processor 110 (more specifically, alert the bus controller 122) to the detected fault. The bus controller 122 may then disable the affective CAN bus.

Aside from arbitration loss and acknowledgment bit handling, a given node 104 does not commonly see its own transmitted recessive bits appear as "dominant." In other words, in accordance with example implementations, each combination of "DR" bits are transmitted by a given node 104 are not expected by the same node 104 to be observed as the bit sequence "DD" on the CAN bus 150. Consistently seen such a combination of a transmitted pattern and observed reception pattern may therefore be used by the fault detector 140, in accordance with example implementations, as indication of an unterminated fault occurring on the CAN bus 150.

Figure 3:
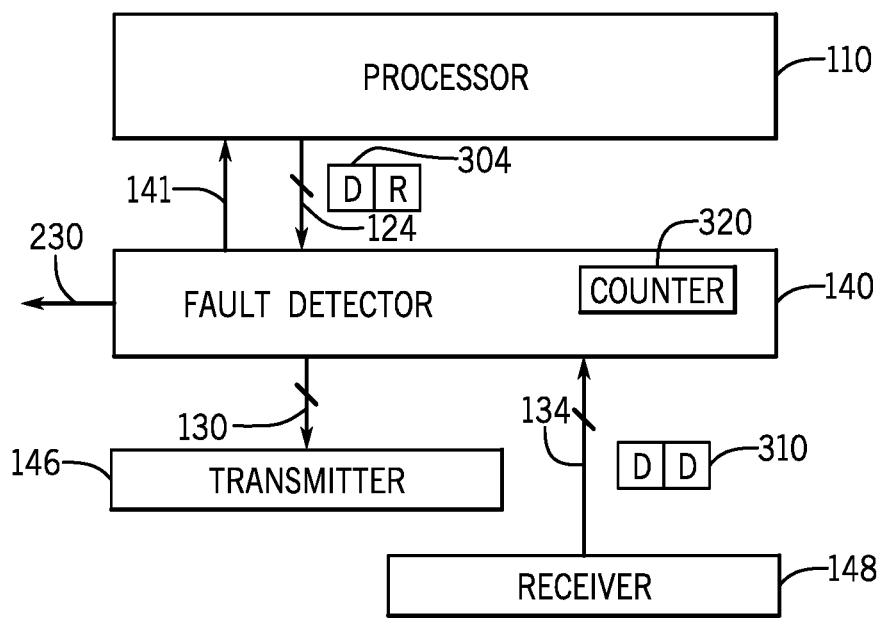

More specifically, referring to FIG. 3 in conjunction with FIG. 1, in accordance with example implementations, the fault detector 140 may detect when the processor 110 transmits a bit sequence 304 of "DR", i.e., transmits the pattern 304 to the transmitter 146 so that the transmitter 146 transmits the DR pattern to the CAN bus 150. Upon transmission, however, the receiver 148 of the same node 104 may indicate detection of a bit sequence 310 of "DD." When this occurs, the fault detector 140 may correspondingly log a count of this combination in a counter 320 of the fault detector 140 for purposes of monitoring a time rate of this combination occurrence.

Figure 4:
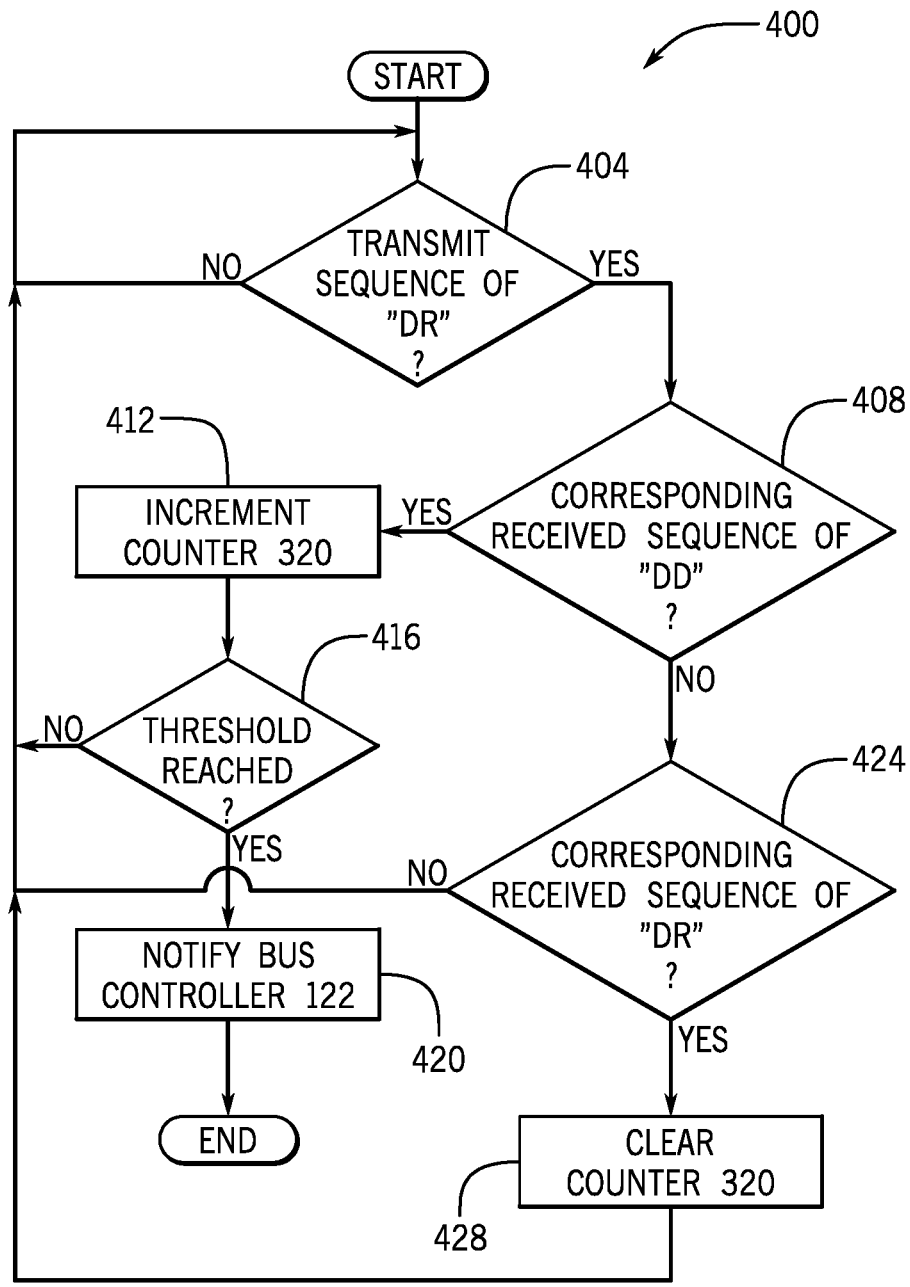
FIGS. 4 and 5 are flow diagrams depicting techniques to detect CAN bus faults according to example implementations.

More specifically, referring to FIG. 4 in conjunction with FIG. 1, in accordance with some implementations, the fault detector 140 may use a technique 400 that includes, determining (decision block 404) whether a bit sequence of "DR" has been communicated to the transmitter 146 of the node 104; and when this occurs, the fault detector 140 may then determine (decision block 408) whether a corresponding received bit sequence of "DD" has been detected by the receiver 148 of the same node 104. If so, in accordance with example implementations, the fault detector 140 increments (block 412) the counter 320 and determines (decision block 416) whether a predefined threshold has been reached. In accordance with some implementations, reaching this threshold means that a certain number of "DR" and "DD"

sequences have been detected without an intervening combination of sequences in which these bit sequence "DR" was transmitted and the bit sequence "DD" was received. In other words, as illustrated in FIG. 4, the fault detector 140 may, in response to determining (decision block 424) that the corresponding receive sequence of "DR" was received, clear the counter 320 as depicted in block 428. However, in accordance with example implementations, upon determining (decision block 416) that the threshold has been reached, the fault detector 140 may then alert, or notify, the bus controller 122 for purposes of disabling the corresponding CAN bus 150.

In accordance with some implementations, the fault detector 140 may re-enable a disabled CAN bus. For example, in accordance with some implementations, the fault detector 140 may clear the counter 320 after a certain period of time to allow the fault detector 140 to thereafter perform a check to see if the CAN bus is functioning properly without the previously-detected fault. As another example, for the detection of the bit pattern 210 (which cause disabling of the CAN bus 150), the fault detector 140 may, after an extended idle period, re-enable the CAN bus upon receiving a pattern of "DRRRRRRR", which is a positive acknowledgement of a correctly received frame.

The fault detector 140 may employ other techniques to detect faults with the CAN buses 150, in accordance with example implementations. For example, the fault detector 140 may use a counter or counter timeout to detect whether a particular CAN bus 150 has been held in the dominant state for an illegal amount of time (a time that exceeds twelve microseconds, for example). As another example, the fault detector 140 may use a counter or counter timeout to detect whether a particular transmit line of a CAN bus has been held in the dominant state for an illegal amount of time (a time greater than twelve microseconds).

Figure 5:
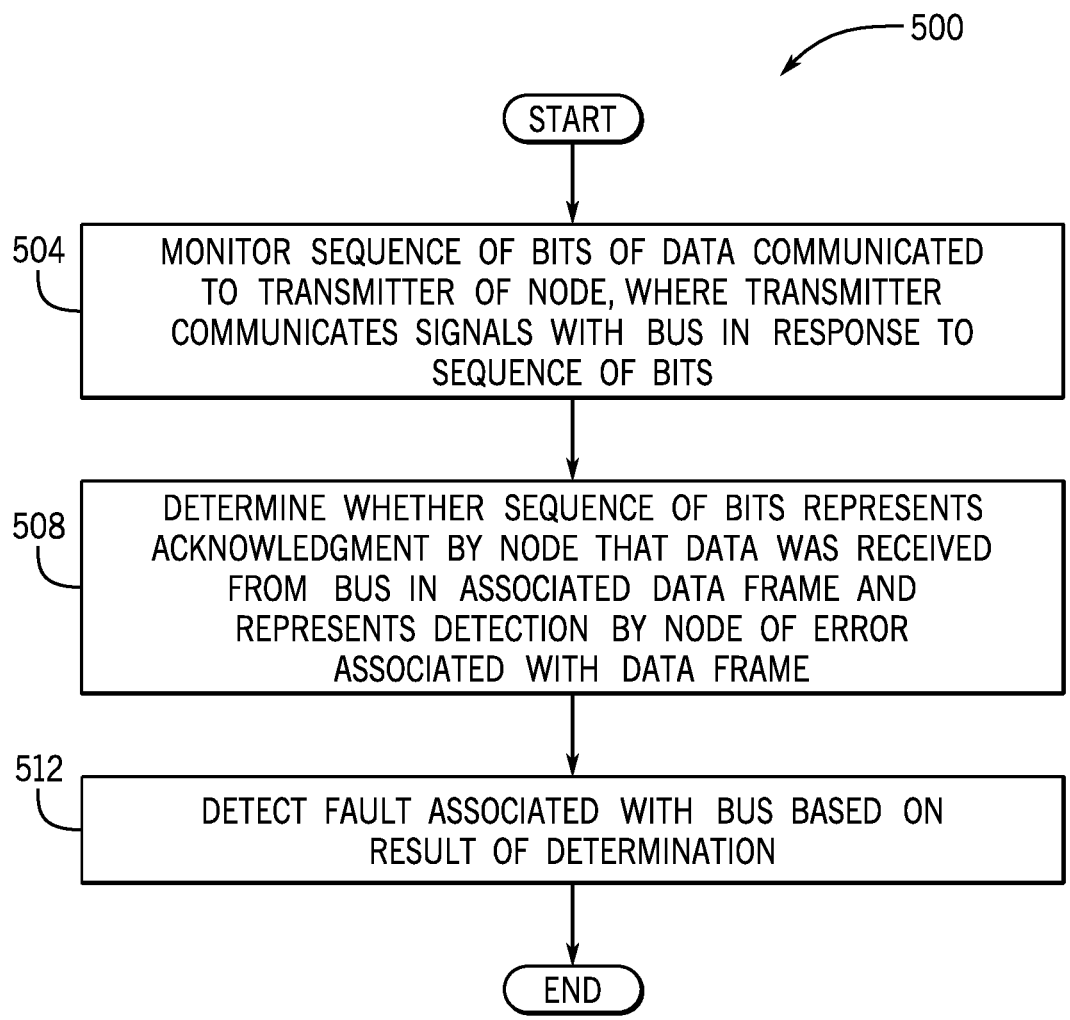

Thus, referring to FIG. 5, in accordance with example implementations, a technique 500 includes monitoring (block 504) a sequence of bits of data communicated to a transmitter of a node, where the transmitter communicates signals with a bus in response to the sequence of bits. The technique 500 includes determining (block 508) whether the sequence of bits represents acknowledgement by the node that data was received from the bus in an associated data frame and represents detection by the node of an error associated with the data frame. A fault associated with the bus may then be detected (block 512) based on a result of the determination.

Figure 6:
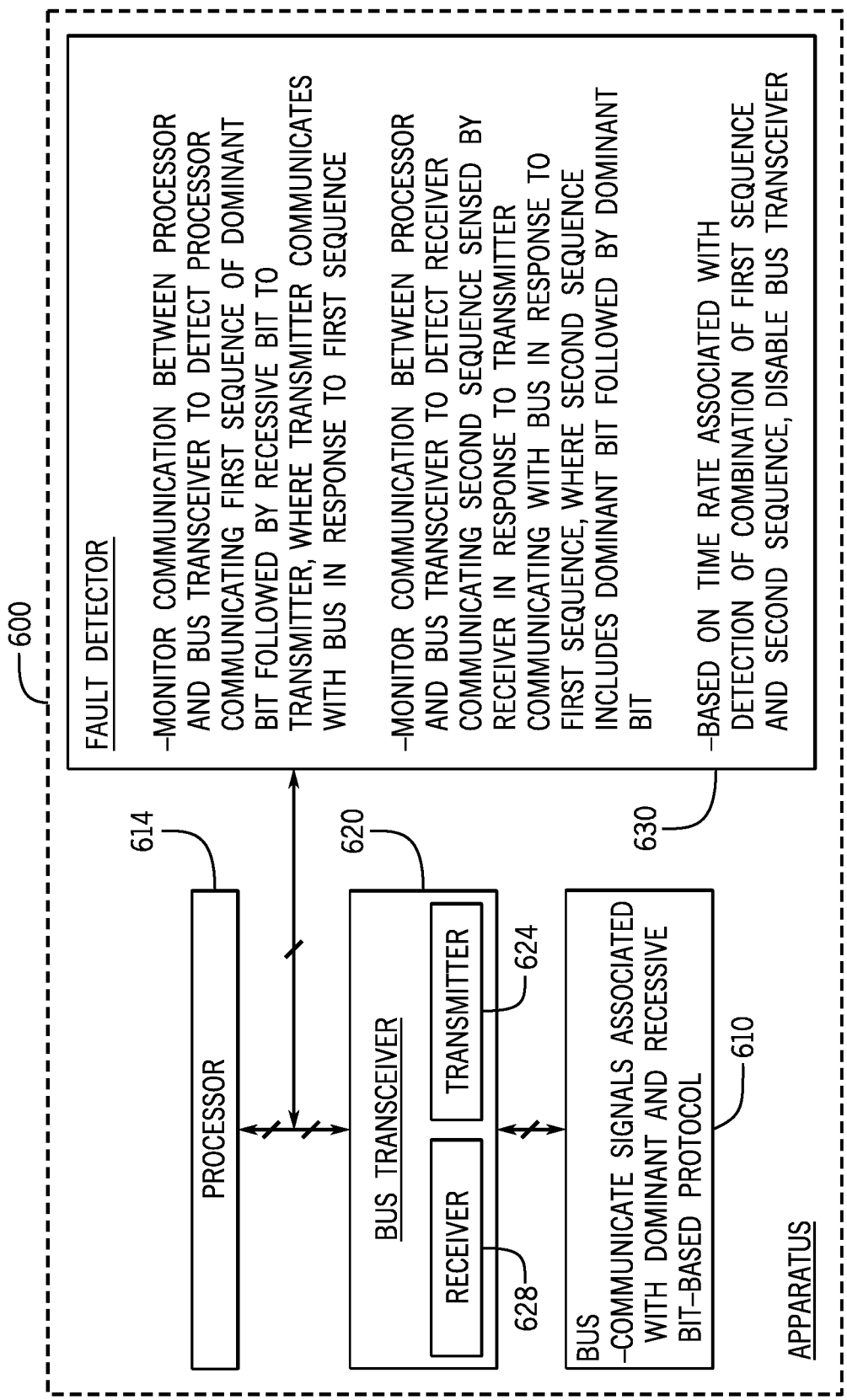
FIGS. 6 and 7 are schematic diagrams depicting apparatuses to detect CAN bus faults according to example implementations.

In accordance with example implementations, an apparatus 600 that is depicted in FIG. 6 includes a bus 610 to communicate signals associated with a dominant and recessive bit-based protocol; a processor 614; a bus transceiver 620, which includes a transmitter 624 and a receiver 628; and a fault detector 630. The fault detector monitors communication between the processor 614 and the bus transceiver 620 to detect the processor 614 communicating a first sequence of a dominant bit followed by a recessive bit to the transmitter 624, where the transmitter 624 communicates with the bus 610 in response to the first sequence. The fault detector 630 monitors communications between the processor 614 and the bus transceiver 620 to detect the receiver 628 communicating a second sequence sent by the receiver 628 in response to the transmitter 624 communicating with the bus 610 in response to the first sequence. The second sequence includes a dominant bit followed by a recessive bit. The fault detector 630 disables the bus transceiver 620 based on a time rate that is associated with detection of the combination of the first sequence and the second sequence.

Figure 7:
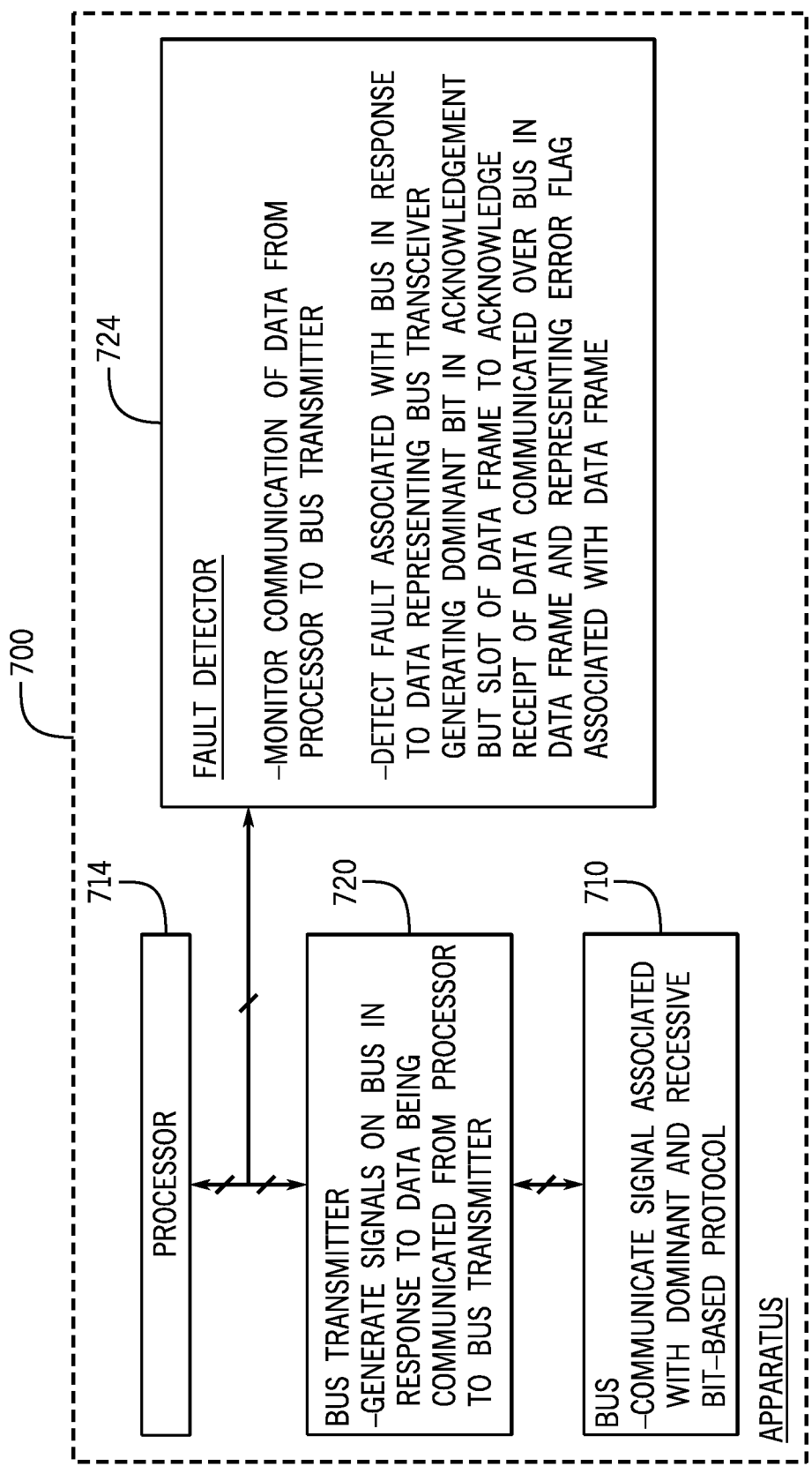

Referring to FIG. 7, in accordance with example implementations, includes a bus 710 to communicate signals associated with a dominant and recessive-based bit protocol; a processor 714; a bus transmitter 720 to generate signals on the bus 710 in response to data being communicated from the processor 714 to the bus transmitter 720; and a fault detector 724. The fault detector 724 monitors the communication of data from the processor 714 to the bus transmitter 720; and detects a fault associated with the bus 710 in response to the data representing the bus transmitter 720 generating a dominant bit in an acknowledgement bit slot of a data frame to acknowledge receipt of data communicated over the bus 710 in the data frame and representing an error flag associated with the data frame.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
monitoring, by a complex programmable logic device (CPLD), a sequence of bits of data communicated to a transmitter of a node to detect the processor communicating a first sequence of a dominant bit followed by a recessive bit, wherein the transmitter communicates signals with a bus in response to the sequence of bits;
detecting, by the CPLD, a second sequence sensed by a receiver in response to the transmitter communicating with the bus in response to the first sequence, wherein the second sequence comprises a dominant bit followed by a recessive bit and wherein the fault detector maintains a count value representing a number of successive times that the fault detector detects the combination of the first sequence and the second sequence; and
disabling, by the CPLD, the node from communicating with the bus based on the count value and a time rate associated with detection of the combination of the first sequence and the second sequence.

2. The method of claim 1, further comprising disabling a bus transceiver coupled to the bus.

3. The method of claim 1, further comprising:
enabling, by the CPLD, the node to communicate with the bus after the disabling of the node;
monitoring, by the CPLD, another sequence of bits of data communicated to the transmitter, wherein the another sequence of bits causes the transmitter to communicate data to the bus;
determining, by the CPLD, whether the another sequence of bits represents acknowledgment that other data was received from the bus and no error associated with communication of the other data received from the bus; and
allowing, by the CPLD, the node to remain enabled to communicate with the bus in response to the determination of whether the another sequence of bits represents acknowledgment that other data was received from the bus and no error associated with communication of the other data received from the bus.

4. The method of claim 3, further comprising:
detecting an idle period of a minimum predetermined duration; and
enabling the node to communicate with the bus after the disabling of the node in response to the detection of the idle period.

5. The method of claim 1, wherein the sequence of bits represents assertion of a dominant bit during an acknowledgment slot of a data frame to indicate that the data was received from the bus and an error flag due to a dominant bit being detected by the node in an acknowledgment delimiter bit slot of the frame.

6. The method of claim 1, wherein the sequence comprises a bit representing acknowledgement by the node that data was received from the bus, and the bit is immediately followed by another sequence of bits of the bit sequence representing detection by the node of the error associated with the data frame.

7. An apparatus comprising:
a bus to communicate signals associated with a dominant and recessive bit-based protocol;
a processor;
a bus transceiver coupled to the bus comprising a transmitter and a receiver; and
a CPLD to:
monitor communication between the processor and the bus transceiver to detect the processor communicating a first sequence of a dominant bit followed by a recessive bit to the transmitter, wherein the transmitter communicates with the bus in response to the first sequence;
monitor communication between the processor and the bus transceiver to detect the receiver communicating a second sequence sensed by the receiver in response to the transmitter communicating with the bus in response to the first sequence, wherein the second sequence comprises a dominant bit followed by a recessive bit and wherein the CPLD maintains a count value representing a number of successive times that the CPLD detects the combination of the first sequence and the second sequence; and
based on the count value and a time rate associated with detection of the combination of the first sequence and the second sequence, disable the bus transceiver.

8. The apparatus of claim 7, wherein the CPLD disables the bus transceiver in response to the count value reaching a predefined value.

9. The apparatus of claim 7, wherein:
the CPLD comprises a counter to store the count value;
the CPLD increments the counter to increment the count value in response to detection of the combination of the first sequence and the second sequence;
the CPLD resets the counter to reset the count value in response to detection of a combination of the first sequence and the receiver communicating a third sequence sensed by the receiver in response to the transmitter communicating with the bus in response to the first sequence, wherein the third sequence comprises a dominant bit followed by a dominant bit; and
the CPLD disables the bus transceiver in response to the count value reaching a predefined value.

10. The apparatus of claim 9, wherein the CPLD to track a number of successive dominant bits communicated by the receiver to the processor and disable the transceiver based on the number.

11. The apparatus of claim 7, wherein the first sequence comprises the dominant bit immediately followed by the recessive bit, and the second sequence comprises the dominant bit immediately followed by the recessive bit.

12. The apparatus of claim 9, wherein the CPLD to track a number of successive recessive bits communicated by the receiver to the processor and disable the transceiver based on the number.

13. An apparatus comprising:
a bus to communicate signals associated with a dominant and recessive bit-based protocol;
a processor;
a bus transmitter to generate signals on the bus in response to data being communicated from the processor to the bus transmitter; and
a CPLD to:
monitor the communication of data from the processor to the bus transmitter to detect the processor communicating a first sequence of a dominant bit followed by a recessive bit;
monitor communication between the processor and the bus transmitter to detect a receiver communicating a second sequence sensed by the receiver in response to the bus transmitter communicating with the bus in response to the first sequence, wherein the second sequence comprises a dominant bit followed by a recessive bit and wherein the CPLD maintains a count value representing a number of successive times that the CPLD detects the combination of the first sequence and the second sequence; and
disable a bus transceiver based on the count value and a time rate associated with detection of the combination of the first sequence and the second sequence.

14. The apparatus of claim 13,
wherein the bus transceiver comprises the bus transmitter.

15. The apparatus of claim 14, wherein the CPLD re-enables the bus transceiver based on a predetermined sequence of recessive bits being detected in the communication of second data from the processor to the bus transmitter, the second data representing the bus transmitter generating a dominant bit in an acknowledgement bit slot of a second data frame to acknowledge receipt of data communicated over the bus in the second data frame, and the second data representing the bus transmitter not asserting an error flag associated with the second data frame.

16. The apparatus of claim 13, further comprising: detect a fault associated with the bus in response to the data representing the bus transmitter generating a dominant bit in an acknowledgement bit slot of a data frame to acknowledge receipt of data communicated over the bus in the data frame and representing an error flag associated with the data frame.

17. The apparatus of claim 13, wherein the receiver is coupled to the bus.

18. The apparatus of claim 13, wherein the fault comprises an open circuit fault.

19. The apparatus of claim 16, wherein the error flag comprises a successive sequence of dominant bits.

* * * * *